Feb. 21, 1967  C. L. NEWBERRY  3,305,050
WHEEL BLOCKS
Filed Oct. 13, 1965

INVENTOR
COY L. NEWBERRY

United States Patent Office 3,305,050
Patented Feb. 21, 1967

3,305,050
WHEEL BLOCKS
Coy L. Newberry, 8377 Woodbine Ave.,
Cincinnati, Ohio 45216
Filed Oct. 13, 1965, Ser. No. 495,660
4 Claims. (Cl. 188—32)

My invention relates to the type of portable wheel blocks commonly known in the practical field as chocks. They are for use as a safety means to prevent vehicles such as automobiles and the like from rollings away from a place where they are intended to remain at rest. In many instances it is necessary to park a vehicle on the side of a road both day and night. Day time parking is not as hazardous as night parking. As an accident preventative a warning device is absolutely necessary to attract the attention of approaching moving vehicles. Flares are rarely on hand in the majority of privately owned motor vehicles and consequently motor vehicles in the dark without warning means become a road hazard. Other dangerous situations prevail when mechanics are working on and/or under motor vehicles. This is especially true when work is being done on the vehicle while it is elevated on a jack. If there is no means other than brakes it is always possible that the weight of the vehicle, while in an inclined position, will cause the vehicle to roll. Many such accidents have occurred to the harm of a mechanic underneath the vehicle because of the vehicle rolling off a jack.

It is an object of my invention to provide a self contracting wheel block that will secure a wheel in fixed position from rolling by blocking it at the front and rear.

Another object of my invention is to provide a wheel block with a reflecting surface that will be illuminated by the head lights of an approaching vehicle from either direction of travel.

A further object of my invention is to provide a wheel block with a reflector warning arm in combination with a flashing light to warn approaching vehicles.

These and other objects will become apparent from the specifications and the drawing comprising this application.

In the drawing.

In the specifications the same indicia will identify similar parts of my invention.

Figure 2:
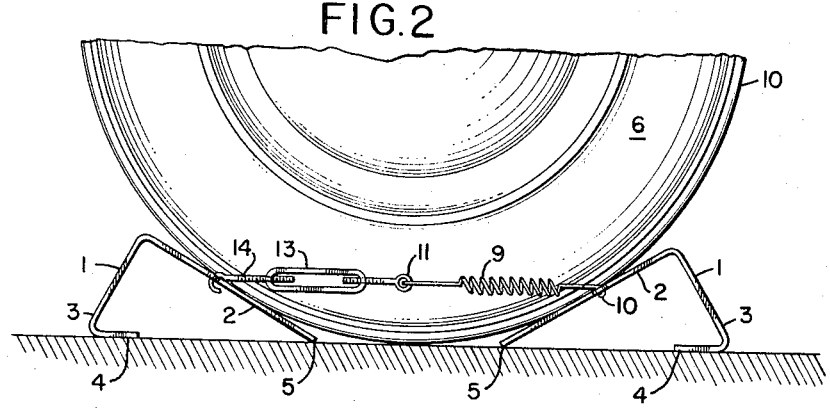
FIGURE 2 is a side elevation showing the wheel block attached to a wheel.
Figure 1:
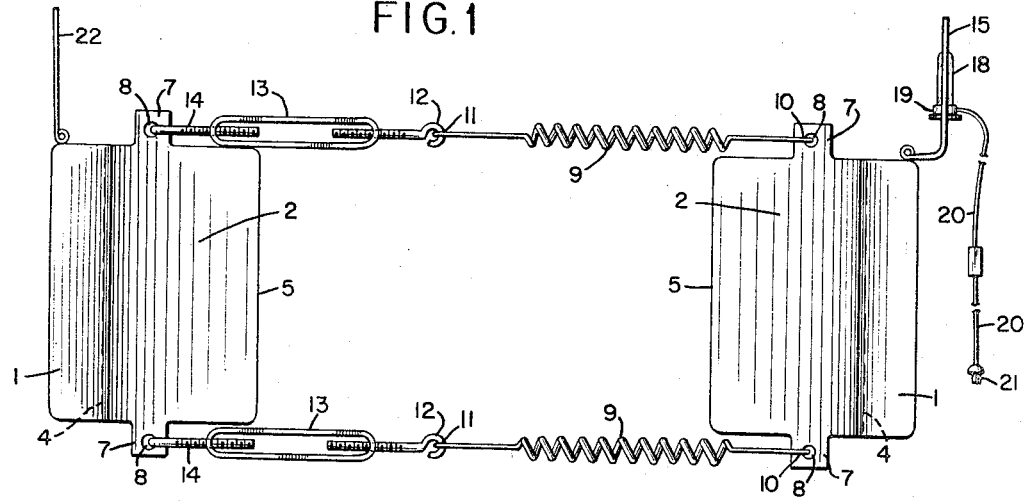
FIGURE 1 is a top plan view of the wheel block showing the springs and chocks.
Figure 4:
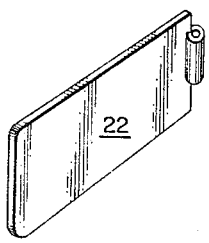
FIGURE 4 is a perspective of a plane type reflector surface detached from the wheel block.

Referring to FIGURE 1 my wheel block is illustrated fully assembled consisting of two separated chocks 1 that are formed from sheet material. They may be cast from fusible material of sufficient strength to resist the impact of a wheel tending to roll. The chocks 1 are essentially triangular when viewed from the sides having top sloping plane surfaces 2 that contact a tread of a wheel. Fixed to the top plane surfaces are legs 3 displaced at an angle downward from the top sloping plane surfaces to form legs that terminate in rest pads 4. An end 5 of the sloping plane surfaces and the bottoms of the pads 4 contact and grip on the surfaces upon which wheels 6 of the vehicle are resting. It is preferred to have the chocks hollow as illustrated so that they may be nested and stored in the vehicle in a minimum of space. Extending outwardly from the sloping plane surfaces there are fixed wings 7 with holes 8 through the wings. Compression springs 9 have ends 10 removably secured in the holes 8 so that one of them can readily be detached from the chock preparatory to placing it on the tire and also to facilitate re-hooking the spring to the chock after the chock resting on a surface is placed in contact with a tire. The springs are extendible and will draw the two chocks towards each other to insure firm contact on the tread 10 of the wheel when the springs are hooked in the wings on the chocks. Other spring ends 11 are hooked into a threaded eye bolt 12 that is screwed into a turnbuckle 13. The turnbuckle is used to adjust the space between the chocks and increase or decrease the tension of the springs. A threaded hook 14 is screwed into the turnbuckle and in turn the hook 14 is removably secured in the holes 8 in the wings 7 on the sloping plane surfaces. The loose linkage of the springs and turnbuckles allow them to double over each other when the chocks are nested together. The connections formed by the hooks and springs to the chocks permits either the springs or the turnbuckle hooks to be disconnected preparatory to placing or removing the chocks from contact with the tread of the wheel and wedged between the wheel and the surface upon which the vehicle is resting.

Figure 3:
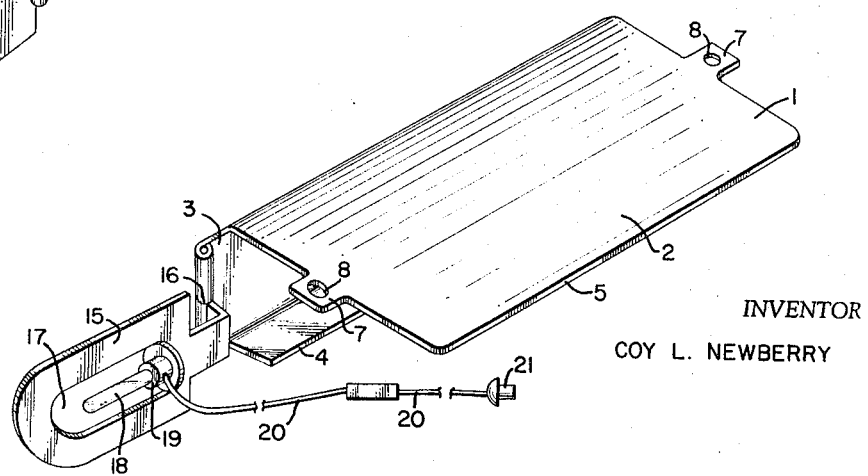
FIGURE 3 is a perspective of one of the chocks showing a hinged reflector together with a signal bulb attached to it.

Referring to FIGURE 3 there is illustrated a panel 15 that is swingable being hingely secured to the leg of the chock. The panel has a right angled arm 16 to offset the panel and thereby allow space between the panel and the leg when the panel is swung around parallel to the leg from an extended position. Centrally located within the panel there is an opening 17. A flashing lamp 18 preferably red in color is secured in an electrical socket 19 that is also secured in the opening. A suitable electrical conductor 20 supplies electrical energy to the lamp. The electrical conduit has the usual plug-in socket 21 having in series with it the usual type of breaker that causes the lamp to flash off and on. Electrical energy is supplied from batteries or from connecting to the lighter socket on the dash board of all machines.

Another swingable hinged panel 22 is attached to the chock opposite the chock upon which the flashing lamp is attached. Both of these panels have a coating of reflecting luminescent paints and in addition to the flashing of the lamp warning is transmitted when the rays of head lights of an approaching car impinge on the panels.

My wheel block is attached to a wheel by unhooking either the spring or the turnbuckle hook from one of the chocks. One of the chocks is then passed around the back of the wheel and brought forward. Each of the chocks are then wedged between the tread and the surface upon which the wheel is resting. After wedging the chocks, the spring and/or the hook is secured in the holes in the wings. The compression of the springs will pull the chocks together and hold them in position and prevent the wheel with the vehicle from rolling away from a fixed position. Normally, only one wheel block is required but if desired two or more can be used. The wheel blocks are relatively small and lightweight and additional ones will not require too much more space to store them when they are not in use.

Having thus described my invention, I claim:

1. A wheel block comprising a pair of chocks having sloping surfaces for impingement on opposite sides of a tread of a wheel secured at an acute angle to padded legs adapted for pressure contact with a surface upon which the wheel is resting;

wings extending from and fixed to said sloping surfaces adapted to receive interconnecting means for wedging said chocks to said tread and surface;

and said interconnecting means being removable, compression springs and connected turnbuckles interconnecting said two chocks to hold said wheel from rolling motion.

2. A wheel block consisting of a pair of chocks as defined in claim 1 and having:

hinged panels rotatably supported in a perpendicular plane on said padded legs and having the surfaces of said panels coated with reflecting materials to provide a reflecting surface to warn approaching vehicles.

3. A wheel block consisting of a pair of chocks as defined in claim 1 and having:

hinged panels rotatably supported in a perpendicular plane, having a cut-out area for mounting and supporting a flashing signal light within said cut-out area to warn approaching vehicles.

4. A wheel block as defined in claim 1 and having:

a rotatably supported panel hinged to each of the padded legs of said chocks;

one of said panels having solid plane surfaces coated with said reflecting materials to provide a reflecting surface and rotatably secured to one of said chocks; and the other of said panels having secured thereto a flashing signal lamp to warn approaching vehicles when said wheel block is in contact with the tread of said wheel and said surface.

References Cited by the Examiner

UNITED STATES PATENTS

| | | | |
|---|---|---|---|
| 1,407,338 | 2/1922 | Skiles | 188—32 |
| 1,599,921 | 9/1926 | Radke et al. | 188—32 |
| 2,481,065 | 9/1949 | Auten | 188—32 |

FOREIGN PATENTS 629,963  9/1934  Germany.

MILTON BUCHLER, *Primary Examiner.*

BENJAMIN HERSH, *Examiner.*

B. S. MOWRY, *Assistant Examiner.*